Figure 1:
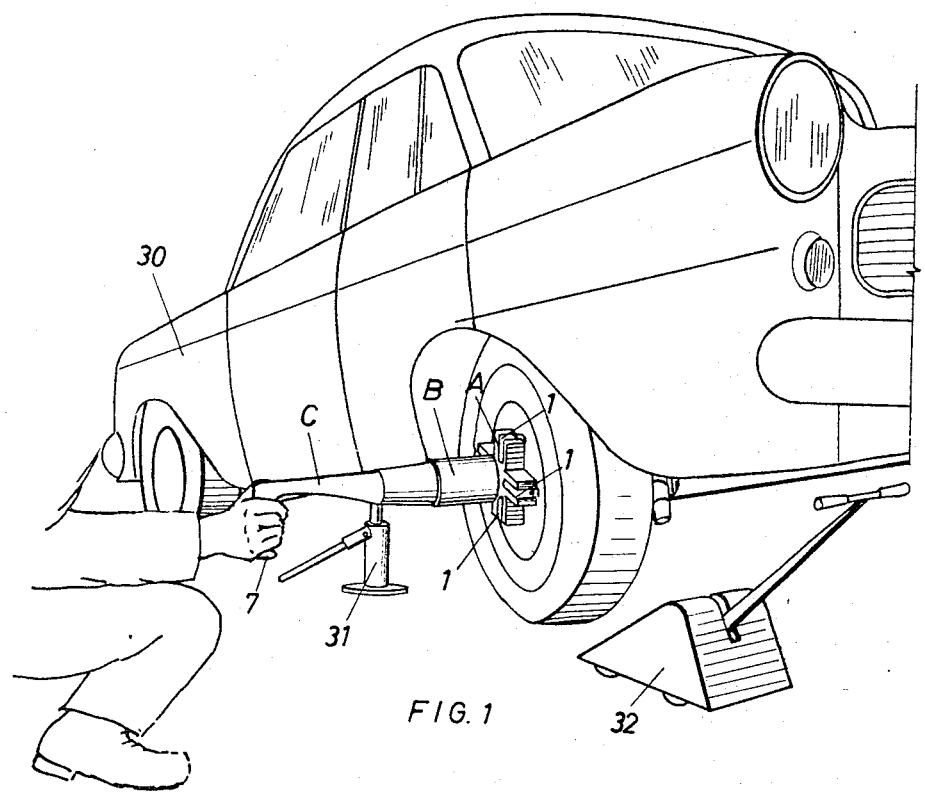

June 27, 1967    L. HELD    3,327,537
METHOD AND APPARATUS FOR BALANCING THE WHEELS OF VEHICLES
Filed Aug. 24, 1964    3 Sheets-Sheet 1

Inventor
Ludwig Held
By Stevens, Davis, Miller & Mosher
Attorneys

June 27, 1967

L. HELD 3,327,537

METHOD AND APPARATUS FOR BALANCING THE WHEELS OF VEHICLES

Filed Aug. 24, 1964

3 Sheets-Sheet 2

Inventor
Ludwig Held
By Stevens, Davis, Miller & Mosher
Attorneys

June 27, 1967  L. HELD  3,327,537
METHOD AND APPARATUS FOR BALANCING THE WHEELS OF VEHICLES
Filed Aug. 24, 1964  3 Sheets-Sheet 3

Inventor
Ludwig Held
By Stevens, Davis, Miller & Mosher
Attorneys

United States Patent Office 3,327,537
Patented June 27, 1967

3,327,537
METHOD AND APPARATUS FOR BALANCING
THE WHEELS OF VEHICLES
Ludwig Held, Darmstadt, Germany, assignor to Gebr.
Hofmann K.G., Maschinenfabrik, Darmstadt, Germany
Filed Aug. 24, 1964, Ser. No. 391,456
Claims priority, application Germany, Aug. 26, 1963,
H 50,104
5 Claims. (Cl. 73—457)

The invention relates to a method of balancing the wheels of vehicles or other rotors, wherein the vehicle is jacked up, the wheel brought to a high speed by a wheel turner and the unbalance of the wheel determined as it runs down to a standstill; it also relates to apparatus for carrying out this method.

In some known methods of balancing the wheels of vehicles, the wheels are dismantled and fitted separately onto the shaft of a balancing machine. Apart from the labor involved in dismantling and mounting the wheels, these methods have the disadvantage that fresh unbalances may arise as a result of inevitable centering errors when mounting the wheel, particularly if insufficient care is taken or if the centering means become worn. Moreover, this process fails to take account of any unbalance in the brake drum or hub. Although these individual unbalances are generally small, they may play a not unimportant role in vehicles driven at high speed if they happen to act at the same angle.

In other known balancing methods the wheels are left on the vehicle. The unbalance oscillations are measured, for example, by dynamic-coil oscillators fitted onto the suspension of the wheel. The angular position is generally determined by stroboscopic methods. These electronic measuring processes with stroboscopic indication of the phase of oscillation require a considerable outlay. But other, purely mechanical processes were too inaccurate or amounted to mere experimental work.

The present invention provides a method and apparatus for balancing the wheels of vehicles or other rotors without dismantling them from the hub of the vehicle or from the rotor shaft and independently of expensive electronic means requiring such maintenance.

The invention provides a method for balancing the wheels of vehicles or other rotors comprising raising the wheel to be balanced clear of the ground, bringing the wheel to a high speed by a wheel turner and determining the unbalance of the wheel as it runs down to a standstill, wherein the relatively small unbalance oscillations of the wheel running down to a standstill are transferred to a resiliently mounted mass which, during passing through its resonance range, is caused to generate resonance impulses, the impulses being related in angle and size to the unbalance oscillation and being marked for direct evaluation on a charting disc rotating with the wheel.

The invention also provides an apparatus for carrying out the method outlined above, which apparatus comprises a rotary member adapted to be connected to the wheel of the vehicle or other rotor, the rotary member including a charting disc, and a non-rotary member adapted to be connected to said rotary member without interfering with the rotation thereof, the non-rotary member including a resiliently mounted mass and a stylus which is adapted to be brought to bear on the charting disc during resonance of the wheel or rotor.

In a preferred embodiment of the apparatus, arresting means are provided for the resiliently mounted mass. The member containing the resiliently mounted mass preferably has a handle which houses a trigger for actuating the arresting means. The handle may be pistol-shaped.

In another preferred embodiment, the rotary member containing the charting disc is star-shaped and is provided with slot-shaped radial recesses which are adapted to receive the nuts on the wheel or other rotor and center this member relatively to the axle of the wheel. Rubber caps may be placed over the nuts on the wheel or other rotor and may bear against the walls of the slot shaped recesses when the rotary member is fitted to said wheel or other rotor.

In yet another preferred embodiment a transfer system with adjustable transmission is provided to transfer the oscillations of the resiliently mounted mass to the stylus. The transfer system may be fixed at a point of rotation at a variable spacing from the plane of impingement of the mass. This embodiment is particularly advantageous in that it is universally applicable. Without the adjustable transfer system the movements of the stylus may otherwise be too small or too large in some cases.

Experience shows that it is particularly desirable for the charting disc to be curved towards the stylus. A flange with a conical guiding surface may be provided at the edge of the charting disc and form a centering plug-and-socket connection with an opposed guiding surface.

The resilient mount of the mass can yield in one degree of freedom and is rigid in the other degrees. This is achieved, for example, by attaching the mass to a plurality of parallel springs.

The mass may contain a conical aperture into which an arresting pin, the front end of which is conical, may engage. It is desirable for a sleeve to be attached to the mass to accommodate the stylus.

Figure 4:
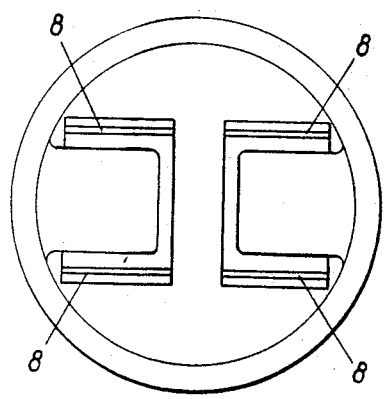
Figure 2:
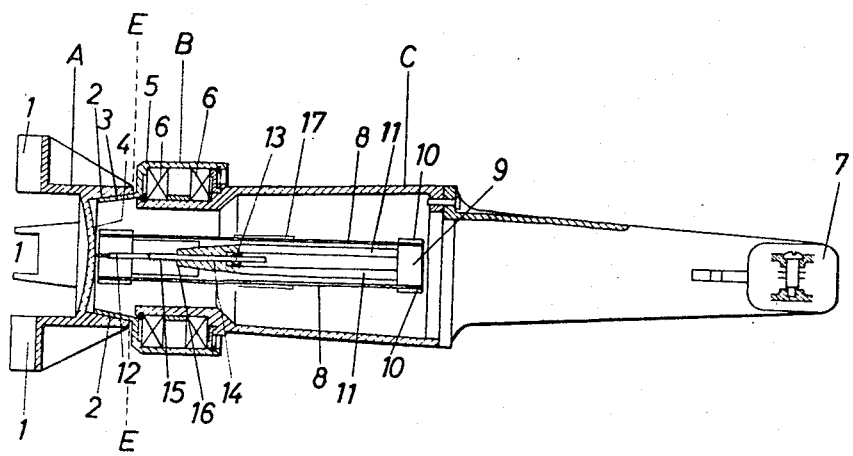
Figure 3:
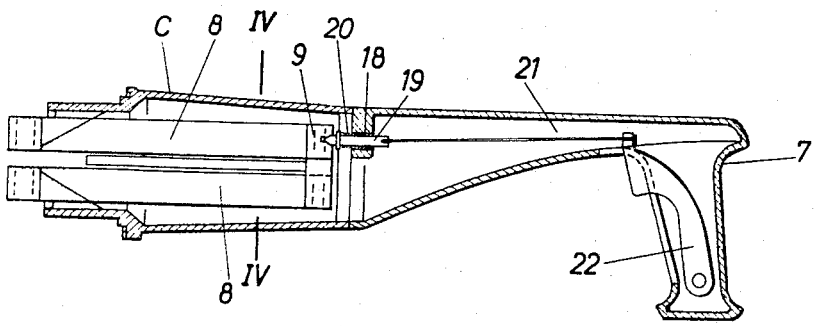
Figure 5:
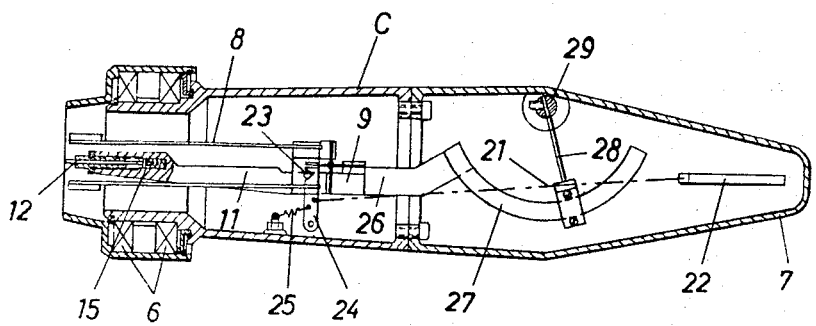
Figure 6:
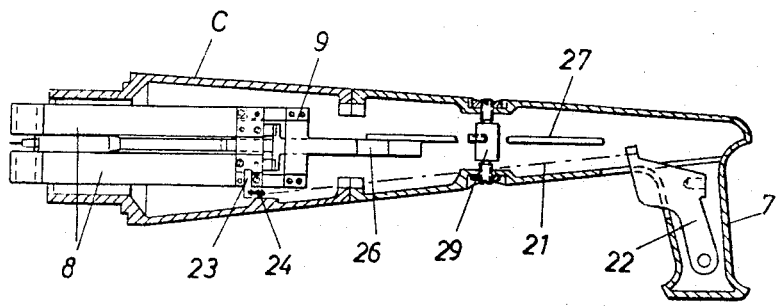

Preferred embodiments of the invention are illustrated in the accompanying drawings, in which:

FIG. 1 is a diagrammtic view of a vehicle with an apparatus according to the invention fitted to one wheel, FIG. 2 is a longitudinal section through a first embodiment of an apparatus according to the invention, FIG. 3 is a section through the rear part of the first embodiment, turned through 90° from the view in FIG. 2, FIG. 4 is a section taken along the line IV—IV in FIG. 3, FIG. 5 is a longitudinal section through a second embodiment of an apparatus according to the invention, and FIG. 6 is a section through the rear part of the second embodiment, turned through 90° from the view in FIG. 5.

The apparatus according to the invention includes a star-shaped support A with slot-shaped radial recesses which can be connected to a vehicle wheel requiring balancing. The star-shaped support A has a conical guiding surface 2 which co-operates for centering purposes with but which may be removed from an opposed guiding surface 3 belonging to a member B. The conical guiding surface 2 begins at the edge of a charting disc 4, which is curved e.g. part-spherical. Adjoining the opposed guiding surface 3 is a casing 5 containing ball bearings 6. The support A containing the slot shaped recesses 1, the conical guiding surface 2 and the charting disc 4 can thus be connected to the member B containing the ball bearings 6 by the centering plug-and-socket connection formed by the conical guiding surfaces 2 and 3. A member C is rotatable relatively to the members A and B and has a handle 7 which may be designed like that of a pistol. The members A and B are designed to rotate with the wheel to be balanced, and the member C is designed to be held by the handle 7. The member C does not participate in the rotary movement of the wheel, but the oscillations resulting from any unbalance in the wheel are transferred to it.

Four parallel leaf springs 8 with a parallelepipedal mass 9 attached to them are connected to the end of the member C facing the wheel. Small clamping plates 10 serve for fixing the mass 9 on the flat springs 8.

Movement of the mass 9 is transferred to a sleeve 11 which houses a stylus 12. The stylus 12 may contain a colored ink or it may merely have a pointed end if the surface of the charting disc 4 is uniformly colored before the balancing process begins. The stylus 12 is received in a guiding bore 14 at the end of the sleeve 11 nearest the disc 4. A spring 15 is located on the stylus 12 one end of which bears against the front end 16 of the sleeve 11 and the other end of which bears against a collar on the stylus 12. The spring 15 serves to urge the stylus forwardly against the charting disc 4. An empty ball-point pen refill can be used as the stylus 12. In order to prevent it from dropping out of the tube 11 when the apparatus is taken apart, the stylus 12 is provided with a ring 13 on the side of the tube remote from the spring 15. The ring 13 is inserted through a suitable aperture 17.

An arresting means for the mass 9 is provided to prevent the writing process from starting too soon. In the first embodiment, the arresting means comprises a bolt 19 sliding in a bush 18. One end of the bolt is conical and this end is urged into an aperture in the mass 9 by a spring 20 so that the mass 9 is fixed relatively to the casing member C. A traction cable 21 is attached to the bolt 19 and to a trigger 22 housed in the handle 7. When the trigger 22 is squeezed, the bolt 19 is withdrawn from the mass 9 and thus the arresting means is released.

The second embodiment shown in FIGS. 5 and 6 differs from the first embodiment shown in FIGS. 1 to 4 chiefly in that it is provided with an adjustable transmission for the stylus 12. For arresting purposes a pin 23 is placed against the mass 9 and engaged by a lever 24 actuated by the cable 21. The action of the cable 21 is counteracted by a spring 25. The arresting means is adapted to be released when the trigger 22 is operated.

In this embodiment, the sleeve 11 is in the form of a lever and it carries a prolongation 26 connected to an arc 27. The sleeve 11 is connected to the mass 9 by a virtually play-free and friction-free bearing, preferably a universal spring joint. The center of rotation for the bearing of the sleeve 11 thus participates in every movement of the mass 9. By means of the arc 27 the fixed point of the so-formed transmission system may be chosen at will within a given range so that, given an equal amplitude for the mass 9, the movements of the stylus 12 may be enlarged or reduced as required. For the purpose of varying the transmission ratio the arc 27 carries a slide which is linked to a screw or bolt 29 preferably by a wire or rod 28 made of spring steel. If the wire or rod is swung clockwise about the bolt 29 the movement of the stylus 12 are enlarged.

The method according to the invention is carried out as follows:

A vehicle 30 is raised by a jack 31. The hub cap is removed from the wheel to be balanced and rubber caps (not shown) placed over the nuts on the wheel. The support A of the apparatus is fitted so that the nuts come to rest in the slot shaped recesses 1. The members A and B are fitted together with their guiding surfaces 2 and 3 in contact and are pressed together by means of the handle 7. The wheel is now driven in one direction, for example clockwise, by means of a wheel turner 32 and then allowed to run down to a standstill. Before the resonance range of the oscillatory system formed by the springs 8 and the mass 9 with sleeve 11 and stylus 12 is reached, the mass 9 is freed by squeezing the trigger 22. As the operation progresses the stylus 12 draws half a curve on the charting disc 4. After passing through the resonance range the mass 9 is refixed by releasing the trigger 22 and the wheel is braked and driven in the opposite direction by means of the wheel turner 32. Shortly before the resonance of the oscillatory system is reached the trigger 22 is operated again and, when resonance occurs, the stylus 12 draws the second half of the curve. When the wheel has stopped the guiding surfaces 2 and 3 may be separated so that the charting disc 4 may be inspected. The charting disc 4 will be marked with the known kidney-shaped oscillation diagram as obtained in the known "end shaft indication process." The line through the indentation in the kidney-shaped graph shows the direction of the unbalance and the width of the graph indicates the size of the unbalance.

An important difference from known methods is that the resonance of the oscillatory system, comprising the wheel of the vehicle and the associated springs, is not used for plotting the graph. In any case the resonance is generally in very unfavorable regions. It may very greatly according to the state of the vehicle since worn bearings may, for example, make a great difference. According to the invention, the unbalance oscillations of the wheel of the vehicle are instead transferred to the defined oscillatory system 8 to 12 which has a predetermined resonance. The adjustable transmission illustrated in FIGS. 5 and 6 enables the movements of the stylus 12 to be regulated. The equipment is accordingly universally suitable for all vehicle wheels since it is always possible to find an appropriate adjustment producing satisfactory markings on the charting disc 4.

The method and apparatus are also suitable for rotors other than the wheels of vehicles. The prerequisite for this is that the rotor must be able to perform oscillations—even if restricted ones—which are transferred to the oscillatory system 8 to 12. Most rotors have sufficient bearing clearance or oscillating capacity to fulfill this condition. The use of the apparatus illustrated is not restricted to overhung-mounted rotors, it can also be used for rotors, it can also be used for rotors fitted between any operating bearings provided that the ends of shafts or other parts of the rotor are accessible outside the bearings.

I claim:

1. A method of balancing a rotary member in its operational state, such as a wheel, fitted to a vehicle, with the aid of balancing means comprising means for transferring unbalance oscillations of said wheel to a resiliently mounted mass, a charting disc adapted to be attached to said wheel, and means for recording the unbalance oscillations on said charting disc, comprising the steps of raising the wheel clear of the ground, fitting thereto said balancing means, rotating said wheel, and allowing said wheel to run down to a standstill, any unbalance oscillations occurring whilst said wheel is running downto a standstill being transferred to said resiliently mounted mass which, whilst it passes through its resonance range, is caused to generate resonance impulses related in size and direction to the unbalance oscillation, and marking said impulses on said charting disk for direct evaluation thereof.

2. An apparatus for measuring the unbalance of a rotor in its assembled state, comprising a first member adapted to be nonrotatably connected with the said rotor, charting disk means mounted on said first member, a second member which is selectively connected with said first member to be rotatably supported therein, a third member, having at one end a cone adapted to make engagement with a corresponding conical recess in the first member, and said third member being rotatably mounted at its other end on the second member, an oscillating system independent of the rotor and its mounting, to which the unbalance oscillations of the rotor are transmitted, said oscillating system being mounted within said second member, a stylus connected with the oscillating system, whereby during the passage through tthe resonance zone of the oscillating system the deflections thereof which are related in magnitude and angular position to the unbalance oscillation of said rotor, are directly evaluably recorded on said charting disk.

3. An apparatus as set forth in claim 2, wherein the second member comprises a handle and means therein for selectively restricting movement of the mass.

4. An apparatus as set forth in claim 2, wherein the first member has slot-shaped, radially extending recesses which can be brought into engagement with the wheel nuts of a motor vehicle wheel so that the first member is nonrotatably connected with the vehicle wheel and centered thereon.

5. An apparatus as claimed in claim 2, comprising means for selectively controlling the deflection of the mass which is transmitted to the stylus.

References Cited

UNITED STATES PATENTS

| 1,457,629 | 6/1923 | Lawaczeck et al. | 73—471 |
| 2,301,291 | 11/1942 | Kolesnik | 73—457 |
| 2,946,218 | 7/1960 | Karpchuk | 73—462 X |

FOREIGN PATENTS

| 811,184 | 4/1959 | Great Britain. |

JAMES J. GILL, *Acting Primary Examiner.*

RICHARD C. QUEISSER, *Examiner.*